Dec. 1, 1953      M. I. TALLEY      2,660,926

PLURAL FILTER SUPPORT AND ACTUATING MECHANISM

Filed April 13, 1950      4 Sheets-Sheet 1

INVENTOR
MAURICE IVAN TALLEY

Dec. 1, 1953 M. I. TALLEY 2,660,926
PLURAL FILTER SUPPORT AND ACTUATING MECHANISM
Filed April 13, 1950 4 Sheets—Sheet 3

INVENTOR
MAURICE IVAN TALLEY
BY
ATTORNEYS

Dec. 1, 1953 M. I. TALLEY 2,660,926
PLURAL FILTER SUPPORT AND ACTUATING MECHANISM
Filed April 13, 1950 4 Sheets-Sheet 4

INVENTOR.
MAURICE IVAN TALLEY
BY
ATTORNEYS

Patented Dec. 1, 1953

2,660,926

UNITED STATES PATENT OFFICE 2,660,926

PLURAL FILTER SUPPORT AND ACTUATING MECHANISM

Maurice I. Talley, Arlington, Va.

Application April 13, 1950, Serial No. 155,771

10 Claims. (Cl. 88—113)

(Granted under Title 35, U. S. Code (1952), sec. 266)

This invention relates to shifting mechanisms and more particularly to an improved filter lens shifting mechanism for varying the light density conditions in the path of incident light of an optical instrument.

Heretofore there have been proposed several devices for selectively interposing filters or other devices into the line of sight of an optical device, such devices being single plane turrets, angular or offset turrets, sliding filters, leaf filters and cam actuated filters all of which have inherent limitations upon their use. Most are bulky, heavy or expensive while others are hard to manufacture and fit into an optical device. The plane turret requires a large area of clearance, the sliding type interposes sealing and linear clearance problems, lever actuated leaf filters usually can operate only one filter at a time and cam operated devices must be locked in place by springs or the like acting directly upon the filter holders and hence, vibration problems are present.

An object of the present invention, is to provide a novel shifting mechanism for moving one or more optical filters into and out of the light path or line of sight of an optical instrument.

Another object is to provide a single knob control mechanism for positioning a plurality of filter lenses alternately or simultaneously in or out of the path of incident light of an optical device whereby desired light density conditions may be obtained.

A further object is the provision of a self locking filter control for moving and firmly retaining a plurality of filter lenses in the desired position either in or out of the path of incident light so as to provide the desired density condition.

Another object is the provision of a filter lens shifting mechanism which is compact in design, requires little space, has few parts and which may be cheaply and easily manufactured.

Other objects and attendant advantages will become apparent from the following description read in conjunction with the accompanying drawings, in which.

Figure 1:
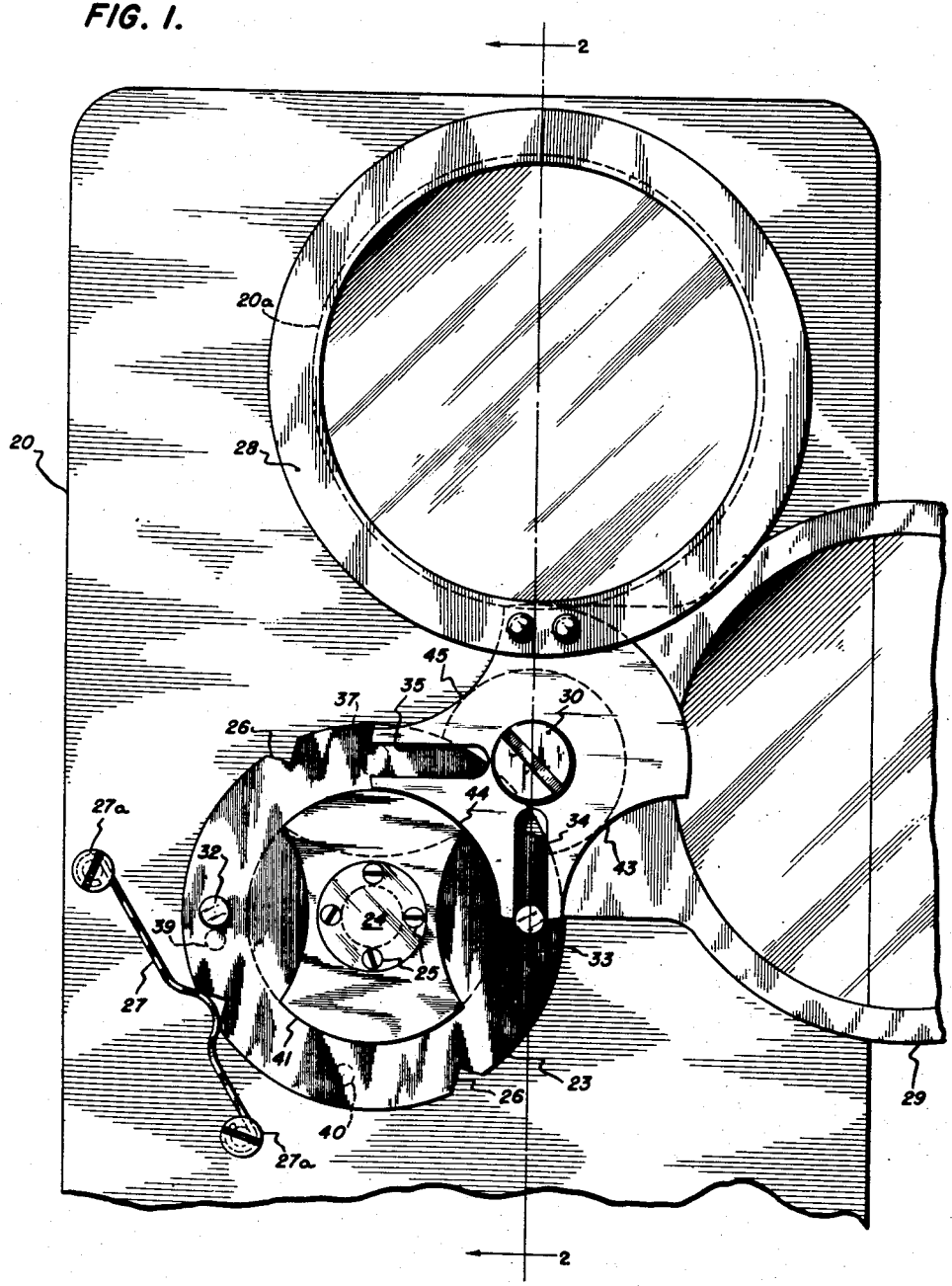
Fig. 1 is an enlarged side elevation of one embodiment of the present invention showing one optical filter positioned in the path of incident light and a second filter swung out of the path of incident light.

The embodiment of the optical filter shifting mechanism shown in the drawings in general comprises a modified Geneva movement which may be actuated by a single control knob to shift two optical filters, one being a light density filter and the other a medium density filter, into or out of the path of incident light of an optical instrument or similar device.

Figure 2:
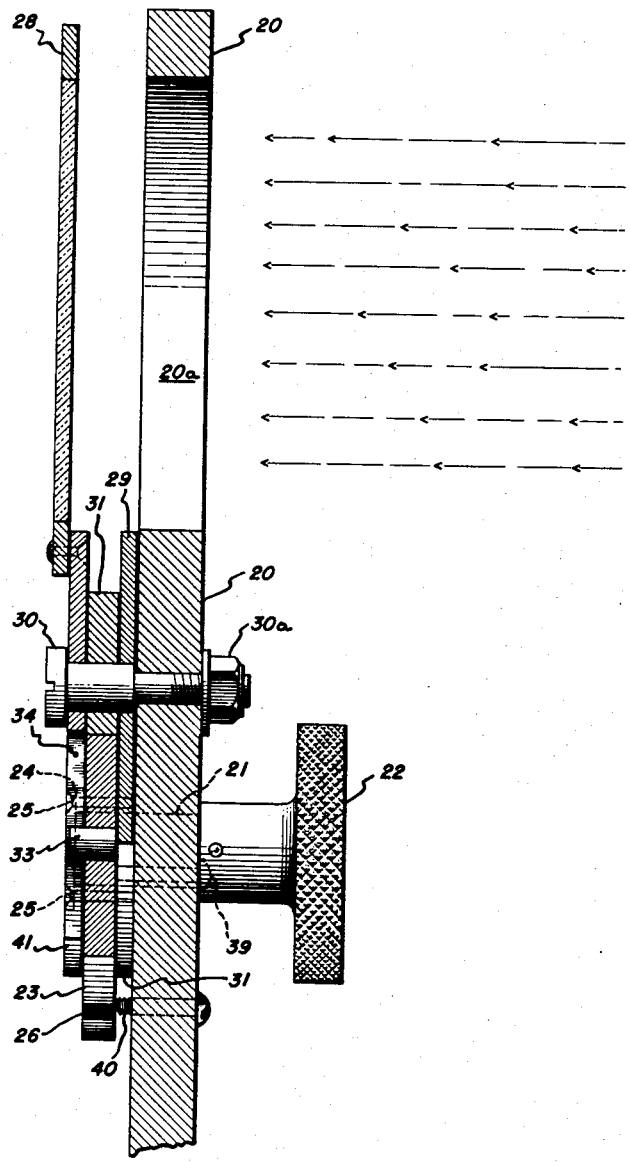
Fig. 2 is a sectional view taken along a line substantially corresponding to line 2—2 of Fig. 1.
Figure 8:
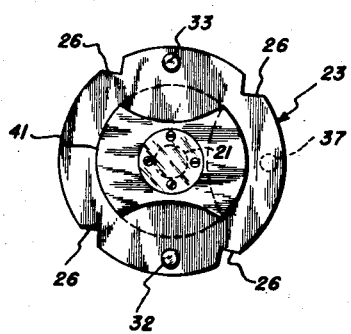
Figs. 8 and 9 are rear and front views respectively of a pin wheel shown in Fig. 2 which, when rotated by a control knob, moves the lens mounting frames to their respective positions.

As illustrated in the drawings, and particularly Figs. 1 and 2, the present shifting mechanism is supported on a base 20 which may be a wall or partition of an instrument or may be attached thereto so as to allow the optical filters to swing in a plane perpendicular to the path of incident light which may pass through a suitable opening 20a in the base. Extending through the base 20 and journaled therein is a shaft 21 that may be rotated by a knurled control knob 22 accessible from the outside of the instrument housing and rigidly attached to the end of the shaft by a pin or other suitable means. Affixed to the opposite end of shaft 21 for rotational movement therewith is a pin carrying wheel 23, hereinafter called a pin wheel, shown in detail in Figs. 8 and 9. As illustrated in Fig. 2, shaft 21 extends through a central opening in the pin wheel 23 and bears a flange 24 that is received in a recess 23a formed in the rear face of the pin wheel. Four screws 25 extend through the flange 24 and are threaded into the pin wheel body to provide a rigid connection between these two members.

The outer periphery of the pin wheel 23 has four equally spaced notches 26 for engagement by an indexing spring 27 that is secured to the base 20 by screws 27a. The index spring may be formed from a flat strip of resilient metal with a medial protuberance as shown which bears against the periphery of the pin wheel so as to exert a drag thereon in order to prevent accidental rotation of the pin wheel. When the pin wheel is rotated by the control knob 22 to a desired position the protuberance positively snaps into one of the notches 27 with a slight click. This click aids in informing the operator that the pin wheel has been rotated to one of four positions, each of which provides a different light density condition. A spring tensioned ball detent may be substituted for the indexing spring and, if desired, a suitable pointer may be attached to shaft 21 or control knob 23 for cooperation with indicia on the instrument housing to indicate the density condition.

Figure 10:
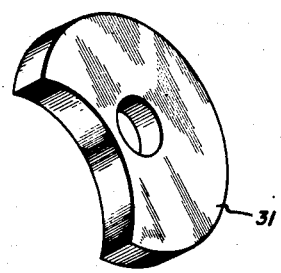
Fig. 10 is an enlarged perspective view of a spacing washer interposed between the lower portions of the lens mounting frames.
Figure 6:
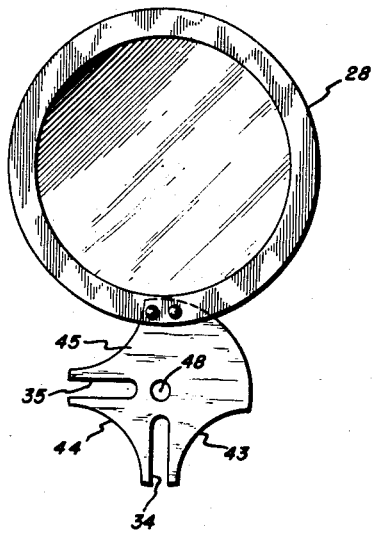
Figs. 6 and 7 are reduced size views in elevation of the individual optical lens mounting frames.
Figure 7:
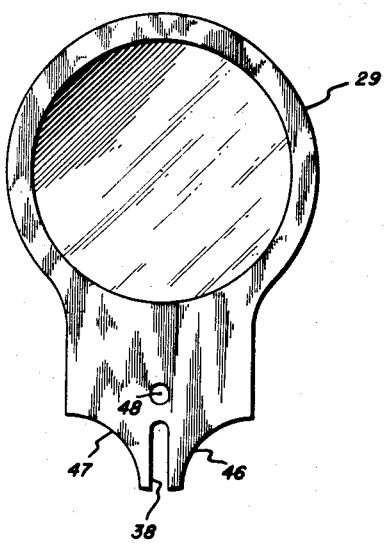
Figure 9:
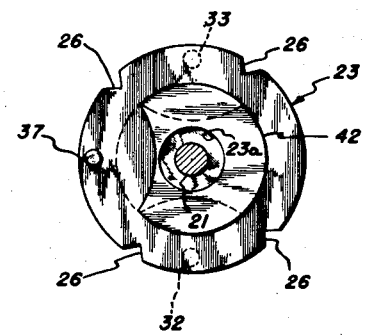

The optical filters used in this device to vary the light density conditions may comprise a relatively clear or light colored filter and a relatively dense or medium colored filter which are carried in individual mounting frames 28 and 29 respectively. These frames are pivotally mounted at their lower ends on a common shoulder screw 30 that extends through the base 20 and is secured thereto by a threaded nut 30a. The lower ends of the filter frames 28 and 29 are provided with Geneva crosses or star wheel drive portions as shown in Figs. 6 and 7 for cooperation with pin wheel 23 as will be explained later. The star wheel portion of frame 28 may be attached thereto by rivets as shown in Figs. 2 and 6 or other suitable securing means may be employed and may be formed of a disc provided with a vertical slot 34 and a horizontal slot 35 which radially extend from the pivot point 48. The edges of the disc may be shaped with scallops 43, 44 and 45 as shown. The other filter frame 29 has a somewhat similar star wheel portion with a single vertical slot 38 flanked by curved portions 46 and 47. A spacing washer shaped as illustrated in Fig. 10 is mounted upon the shoulder screw 30 between the star wheel portions of the frames and is of the same thickness as the peripheral portion of the pin wheel. Thus, the disc of the frame 28 extends across the rear face of the pin wheel while the disc of frame 29 extends across the front face as viewed in Fig. 2. By referring to Fig. 8 it will be noted that the rear face of pin wheel 23 is provided with an integral central boss 41 that is cut away on opposite sides to allow clearance for the movement of the extending star wheel drive portion as the frame 28 is pivoted from one position to another. Similarly, as shown in Fig. 9 the front face of the pin wheel 23 is provided with an integral central boss 42 that is partially cut away on one side to receive the star wheel drive portion of frame 29 as that frame pivotally moves from one position to another. Projecting out from the rear face of pin wheel 23 and spaced 180 degrees apart are two driving pins 32 and 33 which are adapted to engage the slots 34 and 35 respectively in the star wheel drive portion of frame 28 when the control knob 22 is rotated. On the opposite or front face of the pin wheel there is a single driving pin 37 located 90 degrees from pins 32 and 33. Pin 37 engages the slot 38 in frame 29 when the control knob is rotated. Rotational movement of pin wheel 23 is limited by two stop pins 39 and 40 mounted upon base 20 and extending into the path of driving pin 37. The location of these stop pins is such that the pin wheel may rotate 270 degrees or three quarters of a complete revolution.

Figure 3:
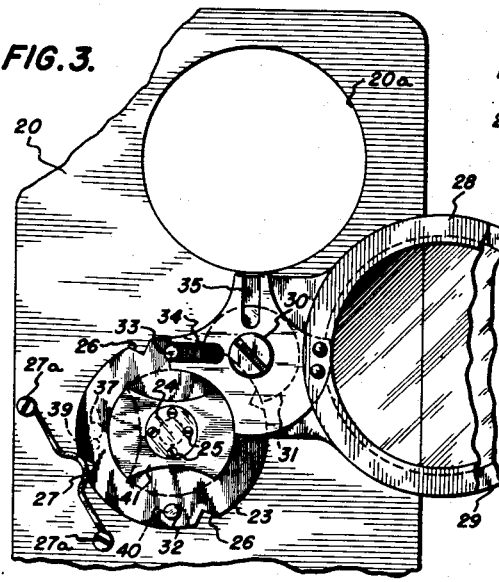
Figs. 3, 4 and 5 are views similar to Fig. 1 but on a reduced scale showing the changed positions of the optical filter lenses that may be obtained by the rotation of a single control knob.

Although the present device contemplates the use of only two filters four different density conditions may be readily obtained by manually rotating the control knob 22. Referring to Fig. 3 it will be noted that in that figure both filter frames are located to the right of the opening 20a in the base 20 through which the path of incident light passes and, accordingly, the density condition is clear. In this position the driving pin 37 on the front face of the pin wheel is engaged by the stop pin 39 and the pin wheel can be rotated only in a clockwise direction. By turning control knob 22 one quarter turn clockwise and thus rotating pin wheel 23 clockwise, the driving pin 33 engages slot 34 of the star wheel portion of frame 28 causing the latter with its filter which may for example be of light density to pivot about the shoulder screw 30 until it moves 90 degrees and is interposed in the path of incident light as illustrated in Fig. 1. When the filter reaches the position shown, the protuberance on index spring 27 snaps into the appropriate notch 26 thereby indicating to the operator that the filter is properly positioned and retaining the filter in its adjusted position.

Figure 4:
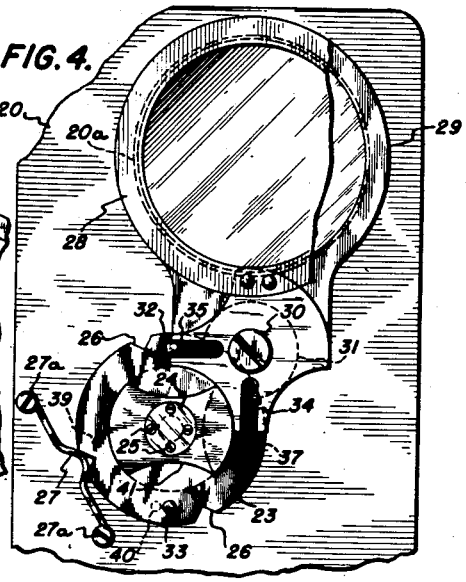
Figure 5:
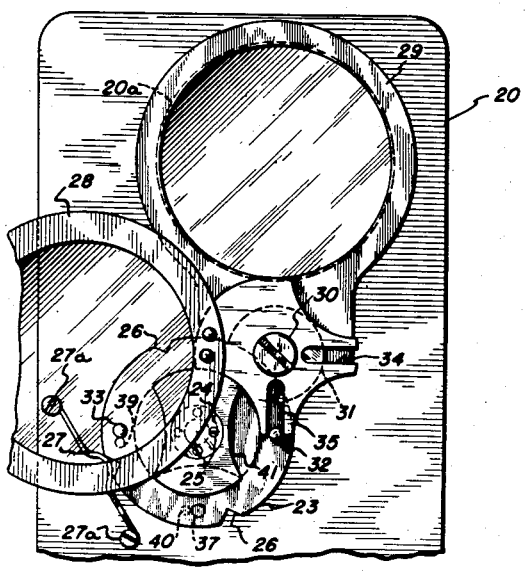

If the pin wheel is rotated an additional quarter turn in a clockwise direction filter 28 remains in its position in the path of light and driving pin 37 on the front face of the pin wheel now engages slot 38 of the star wheel portion of frame 29 thereby pivoting the latter 90 degrees about shoulder screw 30 until the protuberance on index spring 27 engages the next successive notch 26 in the periphery of pin wheel 23 and thus both filters are interposed in the path of incident light as shown in Fig. 4, thereby providing the darkest filter density condition. Further rotation of pin wheel 23 in a clockwise direction through another 90 degree arc causes the driving pin 32 in the rear face of the pin wheel to engage the slot 35 in frame 28 thereby pivoting filter frame 28 90 degrees to the extreme left and out of the path of light as shown in Fig. 5. As frame 28 swings to the left, the driving pin 37 in the front face of the pin wheel strikes one of the stop pins 40 thereby limiting the movement of the frame in that direction. During this movement of frame 28, the other frame 29 carrying the medium color filter remains stationary thereby providing a medium color filter condition in the path of incident light.

The concave surfaces of the star wheel portions of the frames engage with the rounded outside periphery of the bosses 41 and 42 in the usual Geneva movement manner thus preventing any movement of the frames until the appropriate driving pin engages its respective slot.

Although the present invention has been illustrated and described as it may be used in conjunction with optical instruments, it is to be understood that the device may be used advantageously in other types of installations where it is desired to actuate a plurality of devices in planned sequence. Numerous modifications and alterations may be made without departing from the spirit and scope of the invention and accordingly it is intended that it should be limited only by the above specification and the following claims.

The invention described herein may be manufactured and used by or for the Government of the United States of America for governmental purposes without the payment of any royalties thereon or therefor.

What is claimed is:

1. A ray filter mechanism for controlling the light density condition in a path of incident light comprising a base, a shaft rotatably journaled in said base and extending therethrough, a pin wheel fixed to one end of said shaft, a control knob on the opposite end of said shaft for rotating said wheel, a pair of transmission filter carrying frames mounted on said base for pivotal movement about a common axis, extending portions formed on said frames and passing beyond the pivotal axis of the frames, said extending portions being positioned on opposite sides of said pin wheel and having Geneva slots therein, Geneva drive pins mounted on opposite sides of said pin wheel to be accommodated by said Geneva slots for individually pivoting the transmission filter carrying frames into alignment with the path of incident light.

2. Single knob control means for selectively disposing either one or both of two elements in or out of an operating position comprising a support, a shaft journaled in said support, a control knob for rotating said shaft, a Geneva drive pin wheel affixed to said shaft for rotation thereby, and including a plurality of pin members thereon, a pair of transmission filter supporting frames pivotally mounted on said support to be moved into and out of operating position, each of said frames having a Geneva star wheel member formed thereon, said star wheel members being positioned on opposite sides of said pin wheel, said pin members being located on opposite sides of the pin wheel and being 90 degrees out of alignment with each other.

3. A single knob control means for selectively positioning either one or both of two optical elements in or out of an operating position comprising a base, a shaft journaled in said base, a control knob for rotating said shaft, a Geneva drive pin wheel mounted on said shaft for rotation thereby and including a plurality of pin members mounted thereon, said pin members being secured on both sides of said pin wheel and angularly displaced from each other, said two optical elements being mounted on said base for coaxial pivotal movement in parallel planes into and out of the operating position, and two Geneva star wheel driven members mounted each on a different one of said optical elements, said members being positioned on opposite sides of said pin wheel.

4. A filter shifting mechanism for varying the light density condition in a path of incident light comprising a support, a pair of parallel spaced frames mounted on the support for pivotal movement about a common axis, two Geneva driven members each formed on a different one of said frames and passing through and beyond said axis, two transmission filters each mounted on a different one of said frames, a wheel rotatably mounted on said support and extending between said Geneva driven members, a first Geneva driving means mounted on one side of the wheel for moving one of the driven members about the axis to pivot the filter associated therewith into alignment with the path of incident light, a second Geneva driving means mounted on the opposite side of the wheel for moving the other driven member about said axis to pivot the filter associated therewith into alignment with the path of incident light, said first and second Geneva driving means angularly displaced from each other so as to alternately pivot their respective filters, and means for rotating the wheel.

5. A filter shifting mechanism for varying the light density condition in a path of incident light comprising a base, a pair of parallel spaced filters mounted on the base for pivotal movement about a common axis, a Geneva driven member mounted on each filter and passing through and beyond said axis, a wheel rotatably mounted on said support and positioned in a plane which passes between said Geneva driven members, a first Geneva driving means mounted on one side of the wheel for moving one of the driven members about the axis to pivot its associated filter into alignment with the path of incident light, a second Geneva driving means mounted on the opposite side of the wheel for moving the other driven member about said axis to pivot the other filter into alignment with the path of incident light, said first and second Geneva driving means angularly displaced from each other so as to alternately pivot their respective filters, and means for rotating the wheel.

6. In a filter shifting mechanism, a base, a plurality of parallel spaced transmission filters, a Geneva star wheel driven member mounted on each filter, said star wheel members mounted on said base for rotation about a common axis, a supporting member mounted on the base for rotation in a plane parallel with said filters and passing between said driven members, Geneva driving means for each star wheel member to individually rotate the members and cause said filters to move from an inoperative position to an operative position, said driving means mounted on opposite sides of the supporting member and angularly displaced from each other for sequentially and alternately moving said filters, and a single control means for rotating the supporting member.

7. In an optical element shifting mechanism, a base, a pair of optical elements mounted on said base for pivotal movement about a common axis into and out of an operative position, a Geneva star wheel driven member mounted on each of said elements, a Geneva drive member mounted for rotation on said base and including a plurality of pins secured on opposite sides thereof, said pins being angularly displaced from each other, said drive member being positioned to rotate in a plane passing between said driven members, said pins being angularly displaced from each other for sequentially and alternately engaging their respective driven members to individually pivot the optical elements into and out of the operative position, and means for rotating said Geneva drive member.

8. A filter mechanism for controlling the light density condition in a path of incident light comprising a support, a pair of parallel spaced frames mounted on the support for pivotal movement about a common axis, a Geneva driven member formed on each frame, a transmission filter mounted on each of said frames, a wheel rotatably mounted on said support and extending between said driven members, a Geneva drive pin mounted on one side of the wheel for engagement with one of the driven members to pivot the driven member about said axis, a pair of Geneva drive pins mounted on the opposite side of the wheel for engagement with the other Geneva driven member to pivot the member about said axis, said driving pins being angularly spaced from each other, and means for rotating the wheel.

9. A filter mechanism for controlling the light density condition in a path of incident light comprising a base, a pair of optical filters mounted on the base for pivotal movement about a common axis into and out of alignment with the path of incident light, a Geneva driven member mounted on each optical filter, a Geneva driving member rotatably mounted on said base and including a plurality of drive pins mounted on opposite sides thereof for engagement with said Geneva driven members, said driving member extending between the Geneva driven members, said pins being angularly displaced from each other to alternately engage and pivotally move the Geneva driven members and their associated optical filters about the axis from an inoperative position into alignment with the path of incident light, and means for rotating the Geneva driving member.

10. A ray filter shifting mechanism for varying the light density condition in the line of sight of an optical instrument comprising a base, a pair of transmission filters, a pair of parallel spaced frames for said filters coaxially pivotally mounted on said base and individually movable so as to place their respective filters into and out of the line of sight, said filters having different filtering capacities, spaced star wheel sectors one on each frame, and a drive wheel disposed between said spaced sectors, said drive wheel being rotatably mounted on said base, a plurality of pins angularly spaced from one another on opposite sides of the drive wheel for sequential alternate engagement with said star wheel sectors to thereby pivotally move said frames whereby the filters may be individually or collectively interposed into and out of line of sight to provide the desired light density condition.

MAURICE I. TALLEY.

References Cited in the file of this patent

UNITED STATES PATENTS

| Number | Name | Date |
|---|---|---|
| 1,766,637 | Hopewell | June 24, 1930 |
| 1,907,750 | De Jarnette | May 9, 1933 |
| 2,252,015 | Machler | Aug. 12, 1941 |
| 2,399,658 | Banker | May 7, 1946 |

FOREIGN PATENTS

| Number | Country | Date |
|---|---|---|
| 382,072 | Great Britain | Oct. 20, 1932 |